US008073442B2

(12) United States Patent
Frank et al.

(10) Patent No.: US 8,073,442 B2
(45) Date of Patent: Dec. 6, 2011

(54) BINDING A DEVICE TO A PROVIDER

(75) Inventors: Alexander Frank, Bellevue, WA (US);
Bohdan Raciborski, Redmond, WA (US); James S. Duffus, Seattle, WA (US); Jeffrey A. Herold, Bothell, WA (US); Martin H. Hall, Sammamish, WA (US); Paul C. Sutton, Seattle, WA (US); Thomas G. Phillips, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 926 days.

(21) Appl. No.: 11/244,217

(22) Filed: Oct. 5, 2005

(65) Prior Publication Data

US 2007/0079127 A1    Apr. 5, 2007

(51) Int. Cl.
*G06F 7/04* (2006.01)
(52) U.S. Cl. ........... 455/426; 726/27; 726/34; 713/168; 713/176; 713/189; 705/34; 705/50; 705/51; 705/59
(58) Field of Classification Search ................ 726/2, 17, 726/34, 27; 713/176, 189, 170, 181, 175, 713/193, 186, 158, 172, 153; 705/34, 51, 705/39, 50, 75
See application file for complete search history.

(56) References Cited

U.S. PATENT DOCUMENTS

| | | | |
|---|---|---|---|
| 5,388,211 A | 2/1995 | Hornbuckle | |
| 5,905,860 A * | 5/1999 | Olsen et al. | 726/27 |
| 5,915,008 A | 6/1999 | Dulman | |
| 6,799,271 B2 * | 9/2004 | Kugai | 713/168 |
| 6,816,882 B1 | 11/2004 | Conner et al. | |
| 6,850,252 B1 * | 2/2005 | Hoffberg | 715/716 |
| 6,925,493 B1 | 8/2005 | Barkan et al. | |
| 7,694,153 B2 * | 4/2010 | Ahdout et al. | 713/189 |
| 2002/0073334 A1 * | 6/2002 | Sherman et al. | 713/201 |
| 2004/0093506 A1 * | 5/2004 | Grawrock et al. | 713/189 |
| 2004/0201616 A1 * | 10/2004 | Itakura et al. | 345/738 |
| 2005/0182727 A1 * | 8/2005 | Robert et al. | 705/51 |
| 2006/0020525 A1 * | 1/2006 | Borelli et al. | 705/34 |
| 2007/0028109 A1 * | 2/2007 | Wysocki et al. | 713/176 |
| 2007/0061268 A1 * | 3/2007 | Herold et al. | 705/59 |

FOREIGN PATENT DOCUMENTS

CA    2327833    6/2001

OTHER PUBLICATIONS

Albaugh, et al., "The Utility Metering Service of the Universal Management Infrastructure," *IBM Systems Journal*, vol. 43, No. 1, pp. 179-189 (2004).
Pias, et al., "Securing the Internet Metering and Billing," University College London/University of Cambridge publication, 5 pages.
Rappa, M.A., "The Utility Business Model and the Future of Computing Services," *IBM Systems Journal*, vol. 43, No. 1, pp. 32-42 (2004).

* cited by examiner

*Primary Examiner* — Thanhnga Truong
*Assistant Examiner* — Jason Lee

(57) ABSTRACT

A pay-per-use or pay-as-you-go computer uses a secure memory to store individual unique program identifiers. Each unique program identifier is associated with a particular hardware or software component, or service, or the entire computer available to a user. By combining the unique program identifier with a computer hardware identifier uniquely identified transactions may be tracked for both billing and reconciliation. Certificates associated with each unique program identifier, and coupled to the hardware identifier, provide a cryptographic basis for mutual verification of messages, requests, configuration instructions, and provisioning.

8 Claims, 4 Drawing Sheets

BINDING A DEVICE TO A PROVIDER

BACKGROUND

Pay-as-you-go or pay-per-use business models have been used in many areas of commerce, from cellular telephones to commercial laundromats. In developing a pay-as-you go business, a provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone. Similarly, pre-paid cellular telephones are offered to users assuming usage on the cellular network.

In a network-based business, such as cellular telephones, the service provider has some level of assurance that the cellular device will remain connected to its cellular network because otherwise, the subscriber will lose access to service.

However, when providing computers in a pay-per-use or pay-as-you go business model, it is important that the computer remain linked to the correct service provider throughout the contract period but, unlike the cellular telephone, the computer may operate without ties to a network or the associated service provider so close monitoring of the status of the computer may not be possible.

SUMMARY

To enable binding a computer or an associated product or service to a service provider, the computer may use a unique identity which is provided by a hardware identifier. In addition, the computer is provided with a unique program identifier for each provisioned item associated with the computer. The combination of hardware identifier and unique program identifier exclusively binds the computer to the correct provider for that product. In some cases, the entire system, including hardware, software, and services may be bound to a single provider. In other cases, the hardware, peripherals, operating system, application software, etc. may be bound to different providers. The combination of hardware identifier and unique program identifier both ensures that the computer receives provisioning packets only from the authorized provider and ensures that the provider is correctly credited when revenue is received in exchange for the provisioned product or service.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
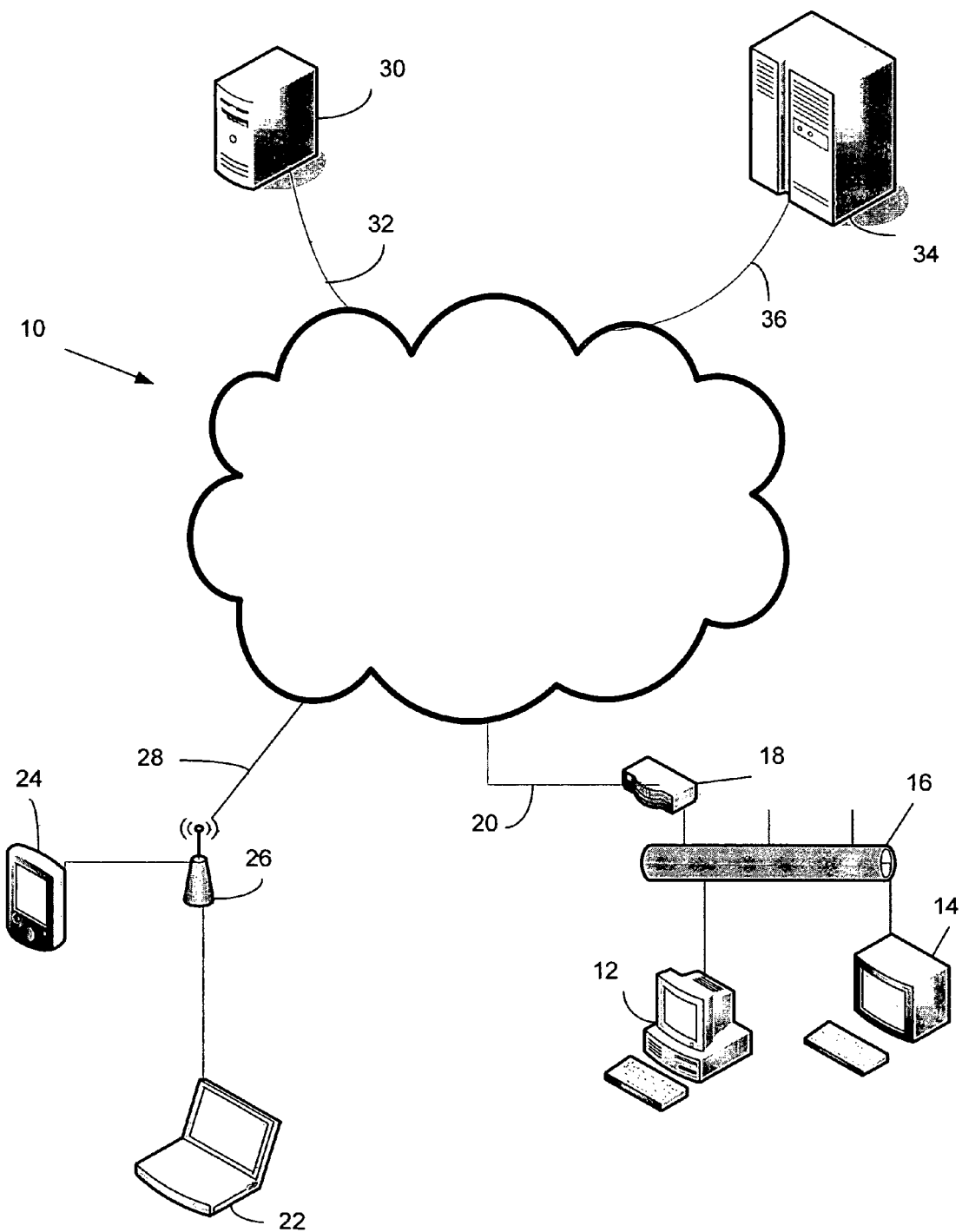
FIG. 1 is a simplified and representative block diagram of a computer network.

FIG. 1 illustrates a network 10 that may be used to implement a pay-per-use computer system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20 using a modem (not depicted). On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

Figure 2:
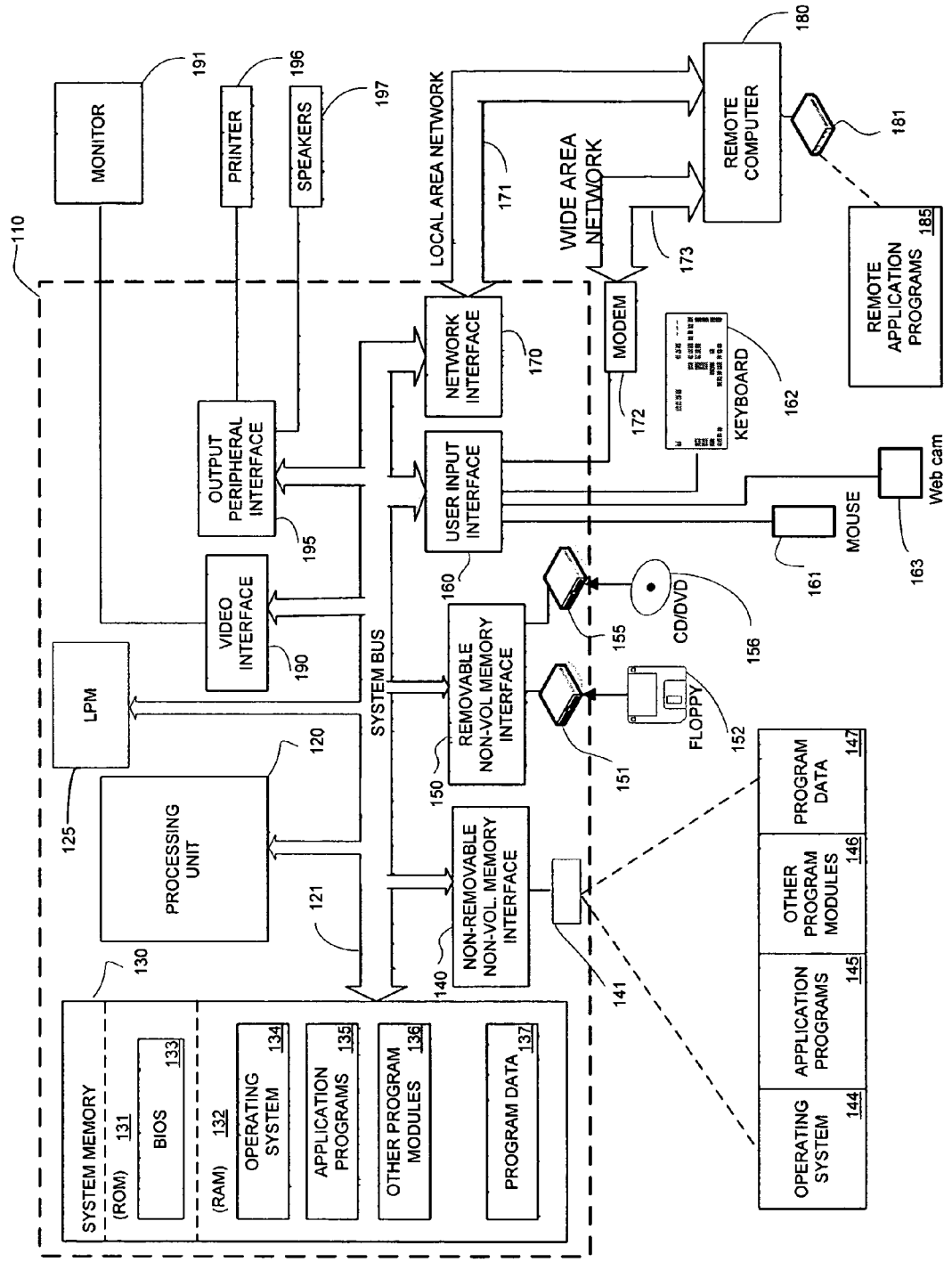
FIG. 2 is a block diagram of a computer that may be connected to the network of FIG. 1.

FIG. 2 illustrates a computing device in the form of a computer 110 that may be connected to the network 10. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a lower provisioning module (LPM) 125. The lower provisioning module 125 is a hardware component of a license provisioning service and has a corresponding software component, an upper provisioning module, refer to FIG. 3. The license provisioning service and its major component elements, the upper provisioning module and lower provisioning module 125 are discussed in more detail with respect to FIG. 3. Briefly, the lower provisioning module 125 facilitates pay-as-you-go or pay-per-use operation of the computer 110. The lower provisioning module 125 manages metering usage, imposing sanctions when metered use is expired, and manages the request, receipt, and processing of data for replenishing the computer 110 for additional metered use. The lower provisioning module 125 may be implemented in hardware as depicted, but may be instantiated in software given an appropriate execution environment in consideration of expected security risks. The lower provisioning module 125 may be a physically separate component, as shown, or may be part of another component, such as the processing unit 120. The lower provisioning module 125 may also include secure memory, a cryptographic function, in hardware or software, and either hardware or software implementations of monitoring and sanctioning circuits, for determining and enforcing compliance with operating policies established by the service provider.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
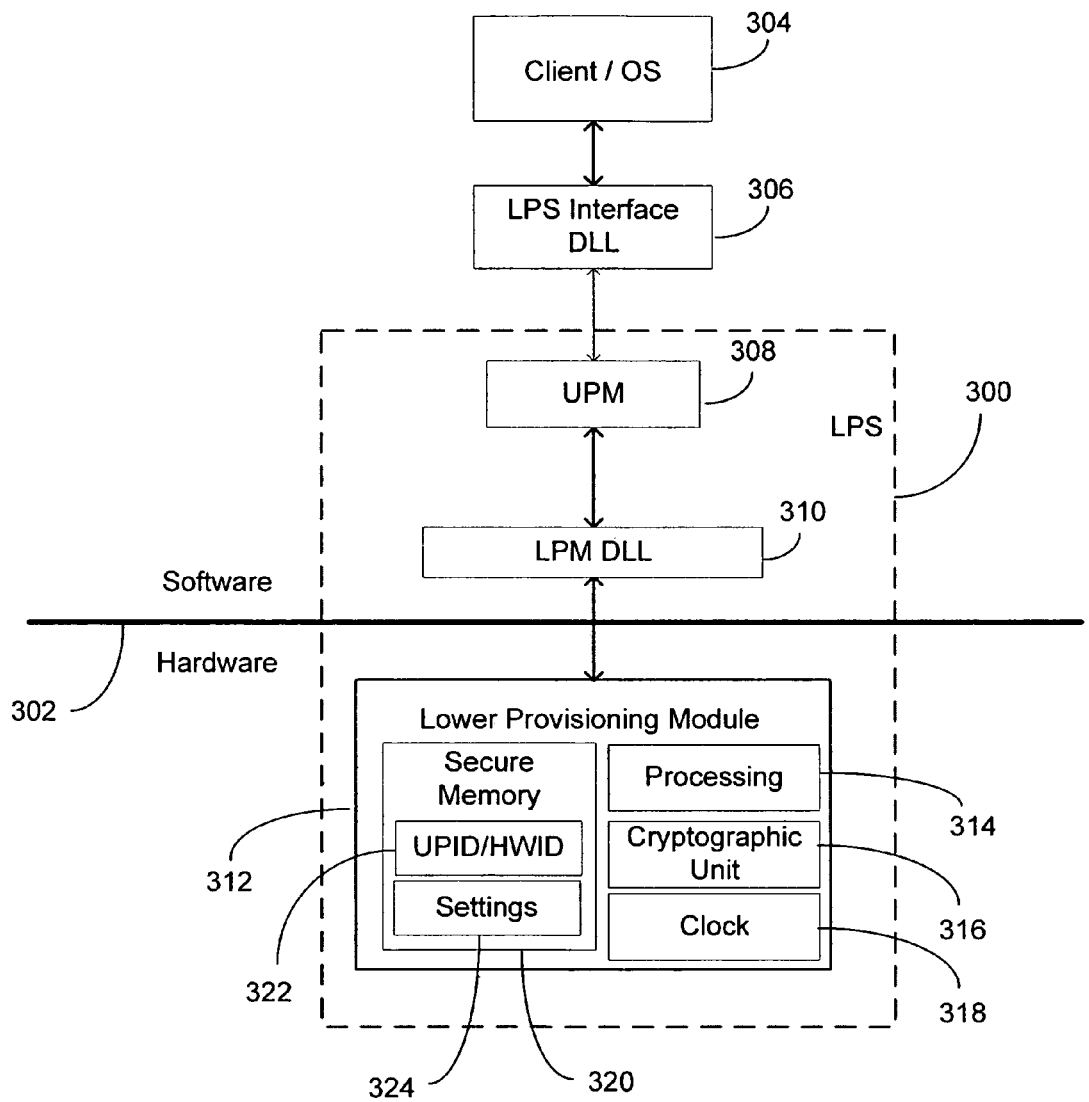
FIG. 3 is a block diagram of a secure system associated with the computer of FIG. 2.

FIG. 3 is a simplified block diagram depicting an implementation of a license provisioning service (LPS). The LPS 300 may act on behalf of a service provider or other operator with an interest in a computer or a component of the computer. The LPS 300 may be used to measure usage (meter), credit and debit a metering account, and determine terms-of-use for both the computer as a whole and subsystems such as peripherals and application programs according to a usage policy, to name a few. The LPS 300 may have hardware and software components as depicted by the line 302, with software components above and hardware components below. However, when trusted execution environments exist, even those components shown below the line may be implemented in software. Clients 304, including application programs 135 and the operating system 134, may use the services of the LPS 300. Access to the LPS 300 may be made through a software driver or an interface dynamic link library (DLL) 306 providing command structures and protocols for interacting with the LPS 300.

The upper provisioning module 308 may be the primary software portion of the LPS 300. The software portion of the LPS 300 may also include a DLL 310 for interfacing with the lower provisioning module 312, that is, the hardware portion of the LPS 300. Interrupts (not depicted) may also be used for communication between the upper provisioning module 308 and the lower provisioning module 312. The upper provisioning module 308 may be used to interact with one or more clients 304 for requesting and receiving registration and provisioning data, as discussed in more detail below with respect to FIG. 4.

The lower provisioning module 312, the same as or similar to the lower provisioning module 125 of FIG. 2, may include its own processing capability 314, a cryptographic unit 316, a secure clock 318, and a secure memory 320. The processing capability 314 may be separate from the processing unit 120 of FIG. 2, but when the lower provisioning module 125 is embodied within the processing unit 120, the processing capability 314 may be the same as the main processing unit 120. The cryptographic unit 316 may be capable of both symmetric and asymmetric cryptography calculations and may be used to verify the digital signatures of both provisioning packets and registration documents, as discussed below.

The secure memory 320 may be tamper-resistant, that is, the contents may only be accessed or changed with cryptographic authentication. In addition, the secure memory 320 may be protected from external observation by means known in the art, such as protective metal layers and balanced data lines. The secure memory 320 may include storage for an identifier 322 including an unique program identifier (UPID) and a hardware identifier. The UPID may include a business code, identifying a product or service provider, and a model code, identifying a specific product or service such as the computer 110, the operating system 134, a particular application program 135, a peripherals such as printer 196 or monitor 191, or a service such as Internet access offered via a network interface 170. Thus, several UPIDs may be stored in the secure memory 320, each identifying a unique offer. The combination of UPID and hardware identifier uniquely defines a particular offer, at least within a given sphere of operation. The UPID and hardware ID may be globally unique, but depending on business requirements may only be unique for a given network or geographical region. Because each combination of UPID and hardware identifier are unique within at least a given sphere of operation, issues associated with distribution of payments may be minimized and individual contributors to a particular computer 110 may be easily identified. It is anticipated that in many cases, a primary system or service provider will take a lead role in the distribution and/or maintenance of the computer 110 as part of an overall system (refer to FIG. 4).

System settings 324, including an operating policy may be stored in the secure memory of the lower provisioning module 312, may include requirements for periodically checking with a host, measurements for and responses to attacks on the system, and a progression of steps to follow when metered time, or other resources, run low or expire. System settings 324 may also include policies and data regarding making changes to the lower provisioning module 312, for example, keys and passwords for changing the unique program ID 322. The system settings 324 may also include requirements for communication with the service provider 402, or a designated entity. The communication may be in the form of a heartbeat, that is, a routine message from the service provider 402 that may include version numbers or another indicator that the system is up-to-date. The heartbeat may also be in the form of provisioning packets, discussed more below. The heartbeat may be used by the license provisioning system 300 to determine if the computer 110 is being "starved" by being cutoff from the system provider. This may be an indication that fraud is occurring, by circumventing the provisioning process or by replacing system code with older versions. When a valid heartbeat is not received during a pre-determined period, a warning message or an operational sanction may be invoked, depending on the system settings 324.

Because the system settings, in conjunction with certificates or at least keys, associated with each unique program identifier allow access at different levels, different service providers may maintain their own contribution to the overall computer 110 without access to other service provider's products. For example, a monitor provider may be able to change the terms associated with use of the monitor 191 without affecting the terms associated with another component by sending a digitally signed message from that service provider with instructions for activating, disabling, or metering a particular function of the monitor 191. Service providers may include entities which actually subsidize (underwrite) the cost of the computer 110 or an associated service, a clearinghouse associated with the distribution of the computer 110, a manufacturer, or other system, component, or service provider.

However, it is likely that the primary system or service provider may be able to alter or remove the contribution of any subordinate service or product supplier. For example, the computer 110 may be returned as part of a trade-up in systems. In this case, the computer 110 may be unbound from each subordinate provider and the unit refurbished. The refurbished computer 110 may then be reequipped by the same or a new system provider with all-new UPIDs, but only as allowed by the resident settings 324 after the correct instructions have been received in verified using appropriate certificates/keys.

Figure 4:
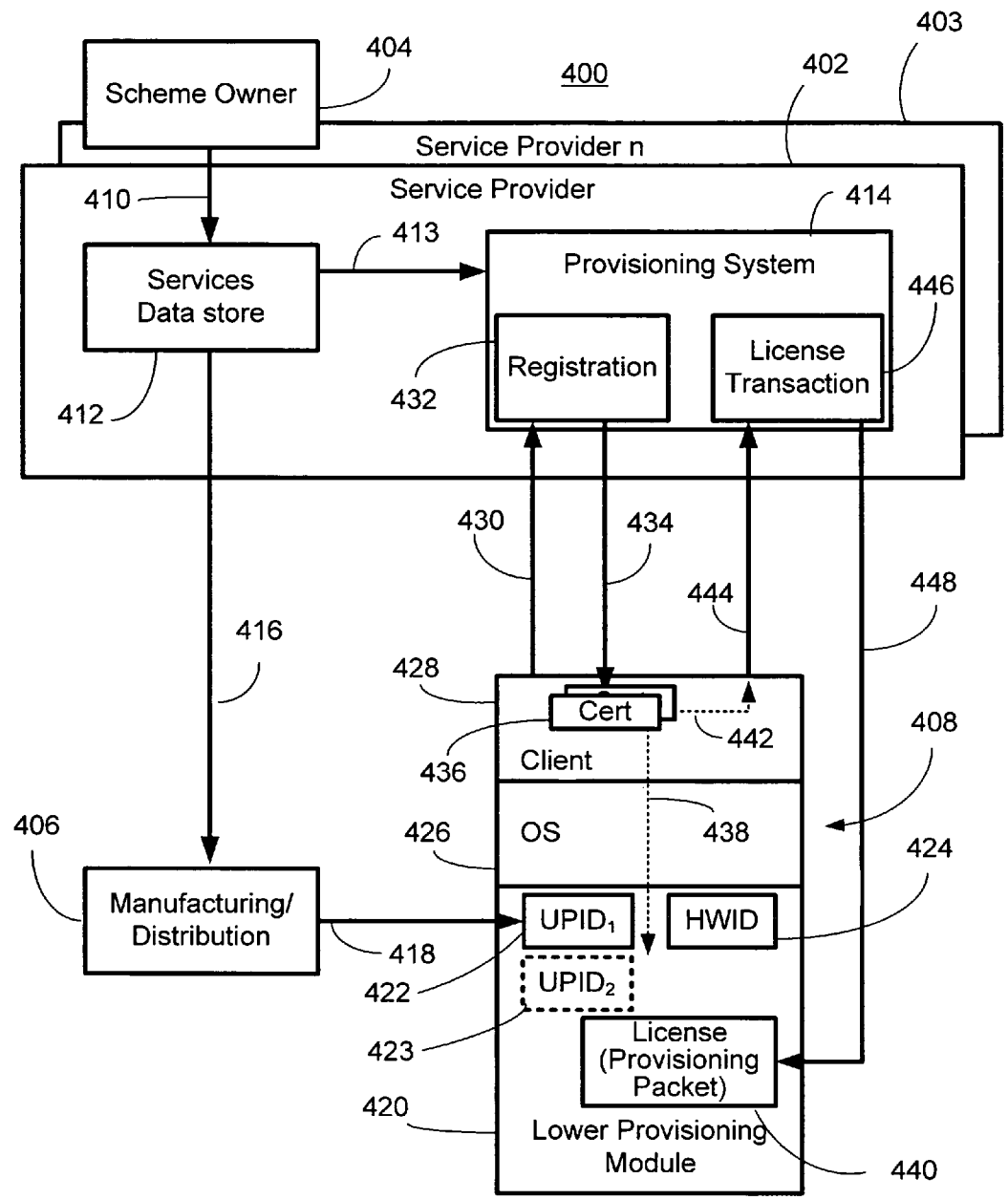
FIG. 4 is a block diagram of a system for provisioning and using a unique program identifier.

Referring to FIG. 4, a system 400 for provisioning and using a unique program identifier is discussed and described. The system 400 may include at least one service provider 402 for providing a product or service associated with, or the entire computer 110. A scheme owner 404 may provide coordination and control between additional service providers (not depicted), as well as an overall system architecture. A manufacturing and distribution function 406 may provide a computer 408 to the end user (not depicted). Of course, FIG. 4 is illustrative only of one embodiment of such a system 400. For example, the scheme owner 404 and service provider 402 may be one entity. Similarly, manufacturing and distribution 406 may be separate entities and additional levels of retail distribution may be present.

Additional alternate configurations of the system 400 are likely. For example, in FIG. 4 the provisioning system 414 is shown under the control of service provider 402. In another embodiment, one or more additional service providers 403 may participate in the system 400. Each service provider may have its own provisioning system 414. Alternately, a single provisioning system 414 may support more than one service provider, up to all participating service providers. Such a provisioning system 414 may be owned by one service provider and offered to other service providers or may be a third-party that makes provisioning available to a number of participating service providers.

The exemplary embodiment discussed below describes manufacture and distribution of a new computer 408. However, an identical or similar flow is easily extended to add-on software, peripherals, or other assets acquired and installed post-manufacture, either in the delivery cycle or by the end-user.

While more than one service provider may contribute to the final computer 408, as discussed above, for the sake of this discussion, the focus will remain on a single service provider. The extension to additional service providers is straightforward and is not discussed in more detail.

The service provider 402 may receive the message 410 from the scheme owner 404 providing a list of available unique program identifiers to be stored in a data store 412. As mentioned above, the UPID may include an identifier for business, that is, the service provider, and a particular product or service identifier. As the UPIDs are issued, they may be moved on data path 413 to a provisioning system 414 for later reference during registration and provisioning packet generation as discussed below. The issued UPID may be moved on data path 416 to the manufacturing and distribution function 406.

It is expected that because the UPIDs are used in later financial transactions, they will be handled using known good practice for electronic information security. The UPID may be installed in individual computers in secure memory such as secure memory 320 of FIG. 3. The UPID may be installed over link 418 early in the manufacturing process while the computer 408 remains in a secure environment or may be installed later in the distribution process. Late installation may require the use of transport keys to secure the memory 320 from tampering by unauthorized entities, as is known. A particular UPID 422 may be stored in a secure memory of the lower provisioning module 420, the same as or similar to the lower provisioning module 312 of FIG. 3. One or more additional UPIDs, associated with other service providers, or other offers from the same service provider, such as UPID 423 may be stored along with the hardware ID 424 in the lower provisioning module 420. The computer 408 may also include operating system 426 and client 428 software stored in normal system memory 130 141 and executed in a conventional fashion.

The lower provisioning module 420 may prevent or limit normal computing functions of the computer 408 until a valid UPID 422 has been installed, particularly when installation of the UPID is delayed to later in the distribution and/or retail delivery process. The UPID 422 may be verified using a key installed in the lower provisioning module 420 or may be verified after the registration process, described as follows.

A message along data path 430 may be sent from client 428 to a registration module 432 of the provisioning system 414. The data path 430 for the registration message, and subsequent transmissions, may be a network, such as network 10 of FIG. 1, but may also use an other input/output mechanism or transfer means, for example, removable media or hand-entered data. The message may include the hardware identifier 424 and the UPID 422 for which registration is being requested. The registration module 432 may verify the UPID 422 against the one previously transferred to the provisioning system 414, described above. The registration module 432, after verification of the UPID 422, may generate a registration message 434 for use by the computer 408. The registration message 434 may include a certificate 436. The registration message 434 may be signed and may include both the UPID 422 and the hardware ID 424. Alternately, the UPID 422 and the hardware ID 424 may be included in a certificate 436. The certificate 436 may follow a standard X.509v3 format, or other industry standard certificate format. While the certificate 436 may be stored in non-secure memory with the client 428, or elsewhere, the certificate may send along path 438 to be validated in the lower provisioning module 420, along with verification of the UPID 422 if not done previously. When the UPID 422 has been verified, operating limitations previously imposed may be removed.

To purchase a provisioning packet for operation of the computer, or underwritten component, the certificate 436, along with the UPID 422 and a request may be sent in a message 444 to a license-transaction function 446 in the provisioning system 414. The request may include billing information for use in making a payment as well as details of the request, such as the number of minutes of use or subscription period for which the request applies. The message 444 may be signed using a key provided in the certificate 436. The message 444 may be a single message, or may be broken into smaller logical requests in sequence. The license transaction function 446 may verify the certificate, the UPID, the hardware ID, the payment information and the appropriateness of the request and generate a provisioning packet for use by the computer 408. The provisioning packet may be sent on path 448 and stored as a license 440 in the lower provisioning module 420 for consumption according to the terms of a license. The provisioning packet may be verified by checking the digital signature using a key supplied in the certificate 436. The lower provisioning module 420 may then meter use for the product or service associated with the UPID 422 according to the settings stored in the lower provisioning module 420, such as settings 324 of FIG. 3.

A certificate may be requested for each UPID, such as UPID 422 and UPID 423. Subsequently, provisioning packets associated with each of the certificates may be received in the computer operated, or configured, in accordance with each corresponding provisioning packet after verification of its validity. As discussed above, provisioning packets, and their associated instructions may have greater and lesser ability to change system settings according to rights granted to the various UPIDs in the system settings 324.

At the end of a contract term, when all conditions have been satisfied, a special provisioning packet called a perpetual packet may be delivered on path 448 and stored as license 440. The perpetual packet may be considered an unlimited term license that stops metering by the lower provisioning module 420, or ignores the results of metering. Thus, a user who has fulfilled the terms of a contract may be allowed full use of the computer from that point on, or at least full use of the product or service associated with a particular UPID 422 specified in the perpetual packet. Thus the operating mode of the computer 408 may be adjusted according to the digitally signed license represented by the provisioning packet 440.

Described above are several specific embodiments including hardware and software embodiments for tying a pay-per-use or pay-as-you-go computer 110 with one or more service providers representing either the computer 110 as a whole, component suppliers, software suppliers, or service providers. The unique program identifier (UPID), by using a combination of business identifier and product model number, allows each product to be uniquely identified across a range of service providers. The addition of a specific hardware identifier when requesting or purchasing services allows unique identification of the request for both billing and reconciliation purposes. The digital certificates created using the UPID in the hardware identifier allow each computer to store and use multiple certificates to uniquely identify requests or purchases associated with each associated service provider. Accordingly, the specification and drawings are to be regarded in an illustrative rather than restrictive sense, and all such modifications are intended to be included within the scope of the present patent.

The invention claimed is:

1. A method for configuring and provisioning a computer for metered operation, the computer comprising a main processor and memory, and a hardware security module comprising a cryptographic unit, a processor, and a tamper resistant memory, the method comprising:
   providing the computer with first and second components that are associated with first and second service providers, respectively;
   causing the computer to receive from a scheme owner at least a portion of a unique program identifier that represents the first and second components of the computer;
   causing a scheme owner to receive a request for a registration document for the computer, the request comprising a full unique program identifier and a hardware identifier, the hardware identifier associated with the computer for uniquely identifying the computer, including the first and second components thereof, within a domain;
   receiving the registration document from the scheme owner at the computer, the registration document digitally signed and includes the hardware identifier and a complete version of the unique program identifier, the registration being verified by the cryptographic unit and in response providing an amount of time according to which the hardware security module meters use of the first or second hardware components;
   causing a provisioning request to be sent from the computer to the scheme owner;
   preparing a provisioning instruction that is digitally signed and comprises the unique program identifier and the hardware identifier for use in qualifying the provisioning instruction;
   providing the provisioning instruction to the computer for configuring the computer according to the provisioning instruction, the hardware security module verifying the provisioning instruction and in response enabling permanent access to the first or second component;
   wherein the unique program identifier allows (i) the first service provider to maintain the contribution of the first component to the computer without accessing the second component and allows (ii) the second service provider to maintain the contribution of the second component to the computer without accessing the first component;
   wherein the first and second components both comprise a peripheral device physically connected to a port of the computer or a computer program stored within a memory of the computer; and
   wherein the tamper resistant memory stores the unique program identifier and hardware identifier, the computer being capable of gaining access to the tamper resistant memory only upon cryptographic authorization by the cryptographic unit.

2. The method of claim 1, further comprising the steps of:
   periodically sending status messages from the computer to the scheme owner while the computer is provisioned; and
   if the scheme owner does not receive a periodic status message within a predetermined period of time, then invoking a sanction.

3. The method of claim 1, wherein the at least a portion of the unique program identifier comprises a business code.

4. The method of claim 1, wherein the unique program identifier comprises a business code and a model code.

5. The method of claim 1, further comprising storing a second unique identifier wherein the second unique program identifier comprises the business code and a second model code.

6. The method of claim 5, wherein the second unique program identifier comprises a second business code and a second model code.

7. The method of claim 1, further comprising: providing the complete unique program identifier to a supply chain entity for installation in the computer in a tamper-resistant memory.

8. A method for configuring and provisioning a computer for metered operation, the computer comprising a main processor and memory, and a hardware security module comprising a cryptographic unit, a processor, and a tamper resistant memory, the method comprising:
   providing the computer with first and second components that are associated with first and second service providers, respectively;
   causing a computer to receive from a scheme owner at least a portion of a unique program identifier that represents the first and second components of the computer;
   causing a scheme owner to receive a request for a registration document for the computer, the request comprising a full unique program identifier and a hardware identifier, the hardware identifier associated with the computer for uniquely identifying the computer, including the first and second components thereof, within a domain;
   sending the registration document from the scheme owner to the computer, the registration document digitally signed with a signature and includes the hardware identifier and a complete version of the unique program identifier, the hardware security module verifying the signature and in response permitting metered access to the first or second component, and during the metered access continued access to the first or second component requires periodic updates from the scheme owner which are verified by the hardware security module to permit continued metered access;

causing a provisioning request to be sent from the computer to the scheme owner;

preparing a provisioning instruction that is digitally signed and comprises the unique program identifier and the hardware identifier for use in qualifying the provisioning instruction;

while the metered access is in effect, providing the provisioning instruction to the computer for configuring the computer according to the provisioning instruction, wherein a signature of the provisioning instruction is verified by the hardware security module and in response permanent access is granted to the first or second component; and wherein the unique program identifier allows (i) the first service provider to maintain the contribution of the first component to the computer without accessing the second component and allows (ii) the second service provider to maintain the contribution of the second component to the computer without accessing the first component;

wherein the first and second components both comprise a product, a program or a service provided by the computer;

wherein the unique identifier comprises first and second unique identifiers, the first unique program identifier comprising a first business code and a first model code, the second unique program identifier comprising a second business code and a second model code;

wherein the first and second components both comprise a peripheral device physically connected to a port of the computer or a computer program stored within a memory of the computer;

wherein the computer includes the tamper resistant memory in which the unique program identifier and hardware identifier are stored, the computer being capable of gaining access to the tamper resistant memory only upon cryptographic authorization; and receiving a provisioning packet, verifying the provisioning packet by the hardware security module, and in response converting access to the first or second component from metered access to permanent access.

\* \* \* \* \*

UNITED STATES PATENT AND TRADEMARK OFFICE
CERTIFICATE OF CORRECTION

PATENT NO. : 8,073,442 B2  Page 1 of 1
APPLICATION NO. : 11/244217
DATED : December 6, 2011
INVENTOR(S) : Alexander Frank et al.

It is certified that error appears in the above-identified patent and that said Letters Patent is hereby corrected as shown below:

In column 9, line 61, in Claim 1, after "second" delete "hardware".

Signed and Sealed this
Thirty-first Day of January, 2012

David J. Kappos
*Director of the United States Patent and Trademark Office*